US012723648B2

(12) United States Patent
Yagi

(10) Patent No.: US 12,723,648 B2
(45) Date of Patent: Sep. 1, 2026

(54) CONTROL DEVICE FOR TRANSMISSION, METHOD FOR CONTROLLING TRANSMISSION, AND NON-TRANSITORY COMPUTER-READABLE MEDIUM

(71) Applicant: JATCO Ltd, Fuji (JP)

(72) Inventor: Hidekazu Yagi, Atsugi (JP)

(73) Assignee: JATCO Ltd, Fuji (JP)

(*) Notice: Subject to any disclaimer, the term of this patent is extended or adjusted under 35 U.S.C. 154(b) by 0 days.

(21) Appl. No.: 19/099,124

(22) PCT Filed: Jun. 29, 2023

(86) PCT No.: PCT/JP2023/024216
§ 371 (c)(1),
(2) Date: Jan. 28, 2025

(87) PCT Pub. No.: WO2024/029248
PCT Pub. Date: Feb. 8, 2024

(65) Prior Publication Data

US 2026/0029051 A1 Jan. 29, 2026

(30) Foreign Application Priority Data

Aug. 2, 2022 (JP) ................................ 2022-123113

(51) Int. Cl.
*F16H 61/04* (2006.01)
*F16H 63/30* (2006.01)

(52) U.S. Cl.
CPC ....... *F16H 61/0403* (2013.01); *F16H 63/304* (2013.01); *F16H 2063/3066* (2013.01); *F16H 2200/0021* (2013.01); *F16H 2200/0039* (2013.01); *F16H 2200/2007* (2013.01); *F16H 2200/2033* (2013.01); *F16H 2200/2069* (2013.01); *F16H 2200/2084* (2013.01)

(58) Field of Classification Search
CPC ........... F16H 61/0403; F16H 2061/044; F16H 2061/0474; F16H 63/304; F16H 2200/0039; F16H 2200/2069; F16H 2200/2084
See application file for complete search history.

(56) References Cited

U.S. PATENT DOCUMENTS 10,113,639 B2 * 10/2018 Kline .................. F16H 61/0213
2020/0032864 A1 * 1/2020 Cicala .................. F16D 48/062

FOREIGN PATENT DOCUMENTS

DE 10 2013 205 610 A1 10/2014
JP 2020-175707 A 10/2020

* cited by examiner

*Primary Examiner* — Huan Le
(74) *Attorney, Agent, or Firm* — Foley & Lardner LLP

(57) ABSTRACT

A control device for a transmission is used for a transmission that includes a first engagement element, a second engagement element, and a third engagement element. The control device for a transmission changes, by driving an actuator for the first engagement element in a state in which the third engagement element is slipped, the first engagement element from a one-way clutch state to a disengaged state and then engages the second engagement element.

6 Claims, 8 Drawing Sheets

| | B1 | B2 | CL |
|---|---|---|---|
| 1st | ○ | − | − |
| 2nd | − | ○ | − |
| 3rd | − | − | ○ |

FIG. 3

CONTROL DEVICE FOR TRANSMISSION, METHOD FOR CONTROLLING TRANSMISSION, AND NON-TRANSITORY COMPUTER-READABLE MEDIUM

TECHNICAL FIELD

The present invention relates to a control device for a transmission, a method for controlling the transmission, and a program non-transitory computer-readable medium.

BACKGROUND ART

Patent Document 1 discloses a vehicle drive device in which a rotating electrical machine and a transmission are disposed on a first shaft, and a differential gear device is disposed on a second shaft. A shifting gear mechanism of the transmission includes a first planetary gear mechanism including a first one-way clutch and a second planetary gear mechanism including a second one-way clutch. Each of the first one-way clutch and the second one-way clutch is a selectable one-way clutch configured to be switchable between a one-direction restriction state in which rotation in one direction is restricted, a bi-directional restriction state in which rotation in two directions is restricted, and a disengaged state in which rotation in two directions is allowed.

PRIOR ART DOCUMENT

Patent Document

Patent Document 1: JP2020-175707A

SUMMARY OF INVENTION

In a transmission that is provided with an engagement element to be engaged in a one-way clutch state (one-direction restriction state), the engagement element to be engaged in the one-way clutch state may be an engagement element to be disengaged at the time of replacement of the engagement element to be performed during gear shift. However, in this case, meshing engagement is performed by the engagement element to be disengaged. Therefore, in a state in which a torque is applied to the engagement element to be disengaged, a force required for the disengagement is accordingly increased. As a result, the disengagement may not be smoothly performed due to the torque applied to the engagement element to be disengaged.

The present invention has been made in view of such a problem, and an object thereof is to smoothly change the engagement element to be disengaged from the one-way clutch state to a disengaged state.

A control device for a transmission according to an aspect of the present invention is used for a transmission that includes a first engagement element, a second engagement element, and a third engagement element. The control device for a transmission changes, by driving an actuator for the first engagement element in a state in which the third engagement element is slipped, the first engagement element from a one-way clutch state to a disengaged state and then engages the second engagement element.

According to another aspect of the present invention, a method for controlling a transmission corresponding to the control device for a transmission is provided. According to still another aspect of the present invention, a program corresponding to the control device for a transmission is provided.

According to these aspects, when the first engagement element, which serves as the engagement element to be disengaged, is changed from the one-way clutch state to the disengaged state, a torque shared by the first engagement element is reduced by increasing a torque shared by the third engagement element. Accordingly, a reaction force applied to an engagement portion of the first engagement element can be reduced, and thus the first engagement element can be smoothly disengaged. For example, when the torque shared by the third engagement element is increased at once to achieve complete engagement, a shock increases. Therefore, it is preferable to set a slip state in which the shared torque is smaller than that for the complete engagement.

BRIEF DESCRIPTION OF DRAWINGS

FIG. 3 is a diagram showing an engagement table of a transmission mechanism.

DESCRIPTION OF EMBODIMENTS

Hereinafter, an embodiment of the present invention will be described with reference to the accompanying drawings.

Figure 1:
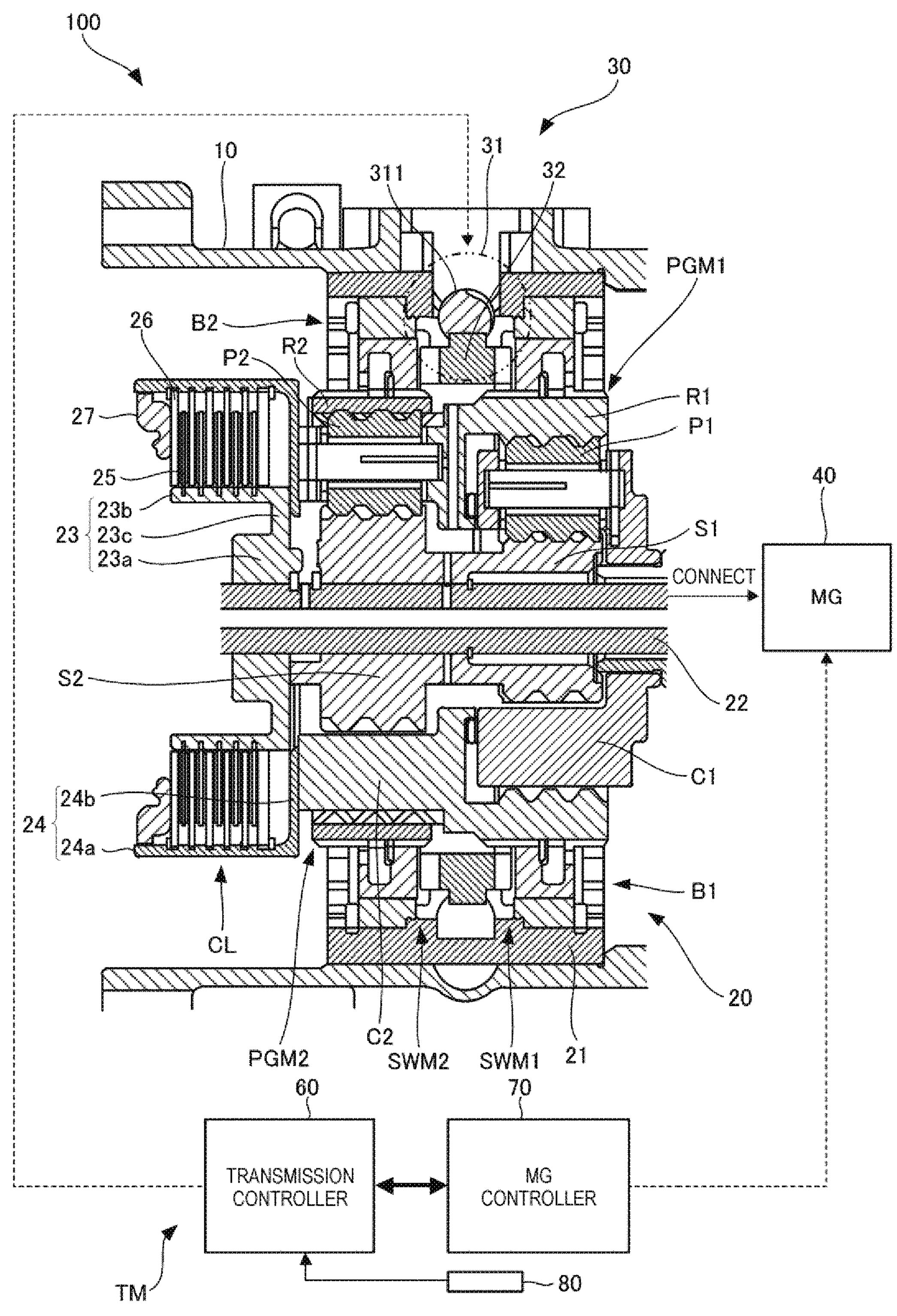
FIG. 1 is a schematic configuration diagram of a unit.
Figure 2:
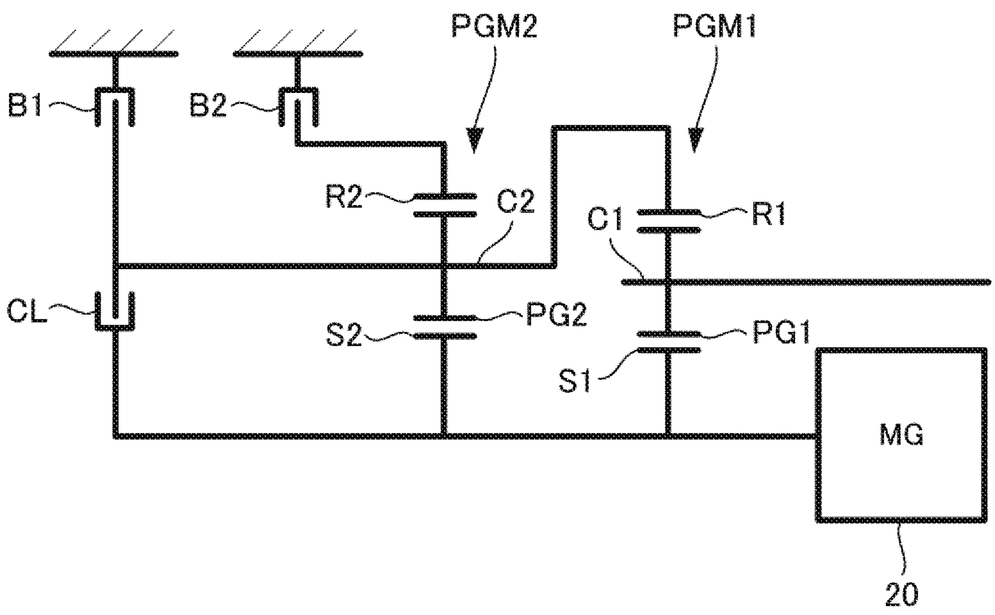
FIG. 2 is a skeleton diagram of the unit.

FIG. 1 is a schematic configuration diagram of a unit 100. FIG. 2 is a skeleton diagram of the unit 100. Regarding the term of unit, the unit can also be referred to as, for example, a motor unit (a unit including at least a motor) or a power transmission device (a device including at least a power transmission mechanism). The motor is a rotating electrical machine having an electric motor function and/or a generator function (at least one of the electric motor function or the generator function). The power transmission mechanism is, for example, a gear mechanism and/or a differential gear mechanism. A device (unit) including the motor and the power transmission mechanism is included in concepts of both the motor unit and the power transmission device.

As shown in FIG. 1, the unit 100 includes a housing 10 and a transmission mechanism 20. The unit 100 is mounted on a vehicle, and the vehicle is an electric vehicle. Power from a MG 40 is input to the unit 100. The MG 40 is a rotating electrical machine that functions as a motor generator, and the unit 100 can be understood as a configuration further including the MG 40.

The housing 10 houses the transmission mechanism 20. The transmission mechanism 20 includes a case 21, a rotary shaft 22, a first planetary gear mechanism PGM1, a second planetary gear mechanism PGM2, a first brake B1, a second brake B2, and a clutch CL. The case 21 has a cylindrical shape and is fixed to an inner periphery of the housing 10. In the case 21, the first planetary gear mechanism PGM1 is provided via the first brake B1, and the second planetary gear mechanism PGM2 is provided via the second brake B2. The rotary shaft 22 is connected to the MG 40, and is rotated by the power from the MG 40. An extending direction of the rotary shaft 22 corresponds to an axial direction of the unit 100, and the axial direction means an axial direction of a rotary shaft of a component (for example, the motor, the gear mechanism, and the differential gear mechanism) that constitutes the unit.

The first planetary gear mechanism PGM1 includes a first sun gear S1, a first carrier C1, a first ring gear R1, and a first pinion gear P1. The first sun gear S1 is coaxially fixed to the rotary shaft 22. The first carrier C1 rotatably supports the first pinion gear P1. The first pinion gear P1 meshes with both the first sun gear S1 and the first ring gear R1. The above also applies to the second planetary gear mechanism PGM2 including a second sun gear S2, a second carrier C2, a second ring gear R2, and a second pinion gear P2.

The second planetary gear mechanism PGM2 is disposed side by side with the first planetary gear mechanism PGM1 in the axial direction. Therefore, the first planetary gear mechanism PGM1 has a portion overlapping the second planetary gear mechanism PGM2 when viewed in the axial direction. The expression "overlap when viewed in a predetermined direction including a radial direction and an axial direction" means overlapping in the predetermined direction, and means that a plurality of elements are disposed side by side in the predetermined direction. Therefore, when the plurality of elements are disposed side by side in the predetermined direction in the drawings, it may be assumed that the description contains a sentence explaining that the plurality of elements overlap each other when viewed in the predetermined direction.

The second planetary gear mechanism PGM2 is provided on a side away from the MG 40 with respect to the first planetary gear mechanism PGM1. The second carrier C2 is formed integrally with the first ring gear R1 to be connected to the first ring gear R1. The second carrier C2 constitutes an output element of the second planetary gear mechanism PGM2. On the other hand, the first carrier C1 constitutes an output element of the first planetary gear mechanism PGM1, and constitutes an output element of the entire transmission mechanism 20 by constituting an output element of the entire first planetary gear mechanism PGM1 and second planetary gear mechanism PGM2.

The first brake B1 is provided on an outer periphery of the first ring gear R1 and is connected to the first planetary gear mechanism PGM1. The second brake B2 is provided on an outer periphery of the second ring gear R2 and is connected to the second planetary gear mechanism PGM2. Therefore, the first brake B1 has a portion overlapping the first planetary gear mechanism PGM1 when viewed in the radial direction, and the second brake B2 has a portion overlapping the second planetary gear mechanism PGM2 when viewed in the radial direction.

Both the first brake B1 and the second brake B2 are meshing engagement elements, and have a meshing engagement structure. When the first brake B1 is engaged, the first ring gear R1 is fixed to the case 21 together with the second carrier C2. As a result, the first ring gear R1 is fixed to the housing 10 together with the second carrier C2. When the second brake B2 is engaged, the second ring gear R2 is fixed to the case 21. As a result, the second ring gear R2 is fixed to the housing 10. The first brake B1 corresponds to a first engagement element, and the second brake B2 corresponds to a second engagement element.

The clutch CL is disposed side by side with the second planetary gear mechanism PGM2 in the axial direction from the side away from the MG 40. The clutch CL is provided for the rotary shaft 22 and the second carrier C2, and connects and disconnects the rotary shaft 22 and the second carrier C2. The clutch CL is a friction engagement element and is a multi-plate clutch. The clutch CL is, for example, an electric clutch, and includes a hub 23, a drum 24, a plurality of drive plates 25, a plurality of driven plates 26, and a piston 27.

The hub 23 is coaxially fixed to the rotary shaft 22. The hub 23 includes an inner cylindrical portion 23*a*, an outer cylindrical portion 23*b*, and a bottom wall portion 23*c* connecting the inner cylindrical portion 23*a* and the outer cylindrical portion 23*b*, and is coaxially fixed to the rotary shaft 22 by the inner cylindrical portion 23*a*. The drum 24 includes a cylindrical portion 24*a* and a bottom wall portion 24*b*, and is provided coaxially with the rotary shaft 22. The drum 24 opens in a direction away from the MG 40. The hub 23 is housed in the drum 24, and an outer periphery of the outer cylindrical portion 23*b* of the hub 23 faces an inner periphery of the cylindrical portion 24*a* of the drum 24. The drum 24 is fixedly connected to the second carrier C2 by the ring plate-shaped bottom wall portion 24*b*.

The plurality of drive plates 25 are provided on the hub 23. The plurality of drive plates 25 have a ring shape and are provided to be slidable in the axial direction on the outer periphery of the outer cylindrical portion 23*b*. The plurality of driven plates 26 are provided on the drum 24. The plurality of driven plates 26 have a ring shape and are provided to be slidable in the axial direction on the inner periphery of the cylindrical portion 24*a*. The plurality of drive plates 25 and the plurality of driven plates 26 are alternately arranged one by one in the axial direction.

The piston 27 is provided in the drum 24. The piston 27 is slidably provided at an inner periphery of an open end of the drum 24. The piston 27 is, for example, an electric piston driven by an electric actuator of the clutch CL, and moves in an engagement direction (a rightward direction in FIG. 1) and a disengagement direction (a leftward direction in FIG. 1) of the clutch CL to engage and disengage the plurality of drive plates 25 and the plurality of driven plates 26.

When the plurality of drive plates 25 and the plurality of driven plates 26 are pressed and engaged by the piston 27 in the engagement direction, the clutch CL is brought into an engaged state. As a result, the rotary shaft 22 and the second carrier C2 are connected via the clutch CL. When the piston 27 is moved in the disengagement direction from this state and the plurality of drive plates 25 and the plurality of driven plates 26 are not engaged with each other, the clutch CL is brought into a disengaged state. As a result, the rotary shaft 22 and the second carrier C2 are disconnected from each other via the clutch CL. In the transmission mechanism 20, speed stages are formed as follows in accordance with an engaged and disengaged state of each of the clutch CL, the first brake B1, and the second brake B2.

FIG. 3 is a diagram showing an engagement table of the transmission mechanism 20. As shown in FIG. 3, the transmission mechanism 20 is configured as a three-stage transmission mechanism having three speed stages of 1st speed stage, 2nd speed stage, and 3rd speed stage, that is, a first gear, a second gear, and a third gear. The first gear is achieved by engaging the first brake B1 and disengaging the second brake B2 and the clutch CL. The second gear is achieved by engaging the second brake B2 and disengaging the first brake B1 and the clutch CL. The third gear is achieved by engaging the clutch CL and disengaging the first brake B1 and the second brake B2.

Returning to FIG. 1, the unit 100 further includes a drive device 30. The drive device 30 is a drive device for the first brake B1 and the second brake B2, and includes an actuator 31 and a worm wheel 32. In FIG. 1, the actuator 31 is schematically shown by a two-dot chain line.

The actuator 31 is an electric motor and includes a worm gear 311. The worm gear 311 constitutes a rotary shaft of the actuator 31 and meshes with the worm wheel 32. A worm shaft of the worm gear 311 and a central axis of the worm wheel 32 are orthogonal to each other, and the worm wheel 32 is provided to be rotationally driven about an axis of the unit 100 by power from the actuator 31. Therefore, a longitudinal direction of the worm gear 311, which is a worm shaft direction, intersects the axial direction of the unit 100.

The worm gear 311 is provided between the first brake B1 and the second brake B2 in the axial direction of the unit 100. Therefore, the actuator 31 has a portion interposed between the first brake B1 and the second brake B2. In the actuator 31, the worm gear 311 has such a portion. The worm wheel 32 is provided between the first planetary gear mechanism PGM1 and the second planetary gear mechanism PGM2 in the axial direction of the unit 100.

The first brake B1 includes a first switching mechanism SWM1, and the second brake B2 includes a second switching mechanism SWM2. The first switching mechanism SWM1 switches an engaged state of the first brake B1, and the second switching mechanism SWM2 switches an engaged state of the second brake B2.

Figure 4A:
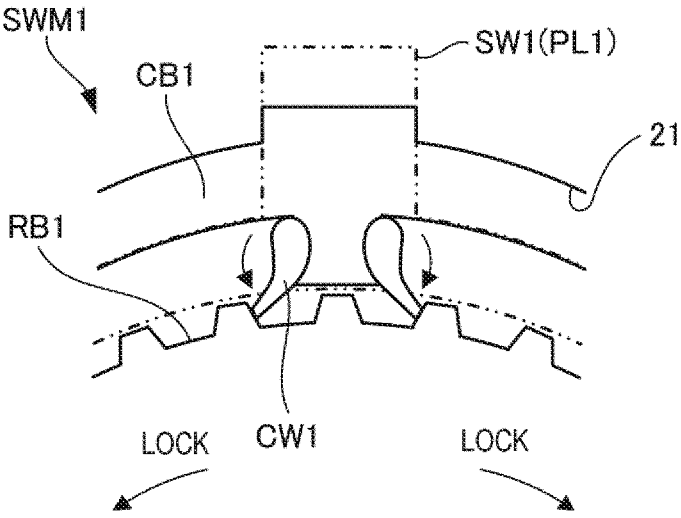
FIG. 4A is a first diagram illustrating a switching mechanism.
Figure 4B:
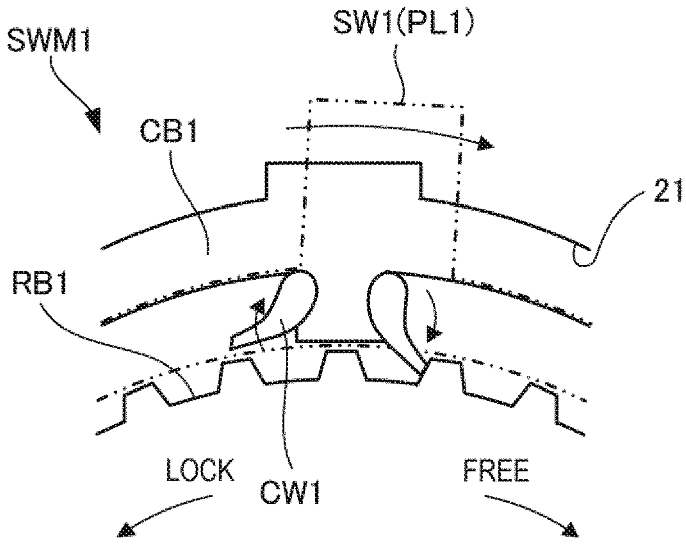
FIG. 4B is a second diagram illustrating the switching mechanism.
Figure 4C:
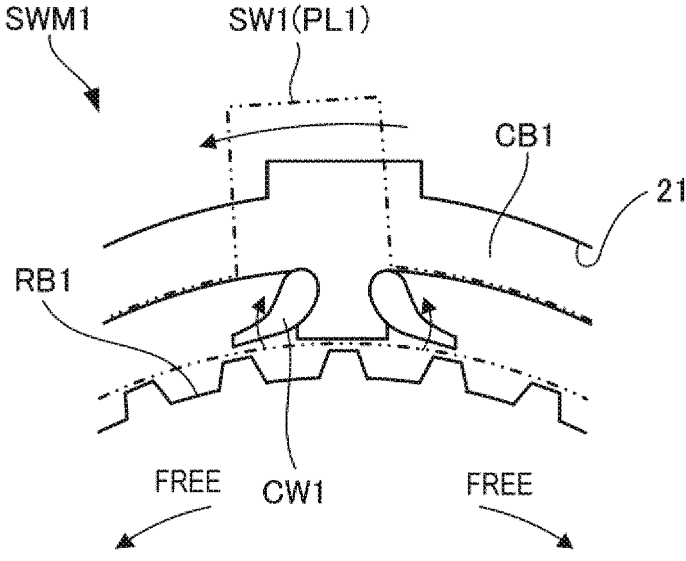
FIG. 4C is a third diagram illustrating the switching mechanism.

FIGS. 4A to 4C are diagrams illustrating a switching mechanism SWM. FIG. 4A shows the first switching mechanism SWM1 in a bi-directional restriction state. FIG. 4B shows the first switching mechanism SWM1 in a one-direction restriction state. FIG. 4C shows the first switching mechanism SWM1 in a disengaged state. In FIGS. 4A to 4C, the first switching mechanism SWM1 is described as an example of the switching mechanism SWM, and the same applies to the second switching mechanism SWM2.

The first switching mechanism SWM1 includes a first fixed member CB1, a first rotary member RB1, first claws CW1, and a first switching unit SW1. The first fixed member CB1 has a ring shape and is fixed to an inner periphery of the case 21. Each first claw CW1 is an engagement portion, and is provided on a portion of the first fixed member CB1 protruding inward in the radial direction. A plurality of portions are provided along a circumferential direction, and two first claws CW1 are provided as one set of claws with respect to one of the portions. Regarding one set of claws, the first claws CW1 are provided in opposite directions so as to correspond to two opposite rotation directions.

Each of the first claws CW1 has a structure in which an inner tip end portion in the radial direction rotates about an outer base end portion in the radial direction. The first claw CW1 is switched between a lock position in which rotation of the first ring gear R1 is locked and a free position in which the rotation of the first ring gear R1 is free, and is biased to the lock position by a spring serving as a biasing member. Therefore, in the state shown in FIG. 4A, each of the first claws CW1 is pressed to the lock position by the spring.

The first rotary member RB1 is fixed to the outer periphery of the first ring gear R1. The first rotary member RB1 has a ring shape, and includes engagement portions formed of a plurality of convex portions provided at equal intervals in a circumferential direction on the outer periphery. The first claws CW1 are engaged with the engagement portions, and constitute the meshing engagement structure together with the engagement portions. The first claws CW1 prevent the first ring gear R1 from rotating in one rotation direction, and allows the first ring gear R1 to rotate in the other rotation direction.

For example, the first claw CW1 on the left side of the set of left and right claws in FIG. 4A prevents the first ring gear R1 from rotating in the rightward direction in FIG. 4A without the tip end portion escaping to the outside in the radial direction, and allows the first ring gear R1 to rotate in the leftward direction by the tip end portion escaping to the outside in the radial direction. The first claw CW1 on the right side prevents the first ring gear R1 from rotating in the leftward direction, and allows the first ring gear R1 to rotate in the rightward direction. As a result, in the bi-directional restriction state shown in FIG. 4A, the rotation of the first ring gear R1 in the leftward and rightward directions is restricted. Therefore, as the first ring gear R1 rotates in two directions, the first brake B1 is in an engaged state.

The first switching unit SW1 includes a first switching plate PL1 and switches the position of the first claws CW1. In FIGS. 4A to 4C, the first switching plate PL1 of the first switching unit SW1 is indicated by a two-dot chain line. The first switching plate PL1 has a ring shape and is movable in the circumferential direction.

The first switching plate PL1 has a position corresponding to the bi-directional restriction state shown in FIG. 4A, a position corresponding to the one-direction restriction state shown in FIG. 4B, and a position corresponding to the disengaged state shown in FIG. 4C. The first switching plate PL1 is provided on the worm wheel 32 and rotates together with the worm wheel 32. Therefore, the first switching plate PL1 is driven in the circumferential direction by the actuator 31, and the position of the first switching plate PL1 is switched accordingly.

For example, when the first switching plate PL1 is rotationally driven to a fixed position on the right side from the state shown in FIG. 4A, the position of the first switching plate PL1 is switched to the position corresponding to the one-direction restriction state shown in FIG. 4B. At this time, the first switching unit SW1 switches the position of the first claw CW1 on the left side to the free position by pressing the tip end portion of the first claw CW1 on the left side to the outside in the radial direction against a biasing force of the spring. As a result, the first claw CW1 on the right side is disengaged from the engagement portion of the first rotary member RB1, and thus the rotation of the first ring gear R1 in the rightward direction becomes free. On the other hand, in this case, the first claw CW1 on the right side remains engaged with the engagement portion, and thus the rotation of the first ring gear R1 in the leftward direction is locked. Therefore, in this case, the first brake B1 is in the disengaged state with respect to the rotation of the first ring gear R1 in the rightward direction, and is in the engaged state with respect to the rotation of the first ring gear R1 in the leftward direction.

When the first switching plate PL1 is rotationally driven to a fixed position on the left side from the state shown in FIG. 4A, the position of the first switching plate PL1 is switched to the position corresponding to the disengaged state shown in FIG. 4C. At this time, the first switching unit SW1 switches the positions of both the left and right first claws CW1 to the free position by pressing the tip end portions of both the left and right first claws CW1 to the outside in the radial direction against the biasing force of the spring. As a result, the rotation of the first ring gear R1 in the leftward and rightward directions becomes free.

Figure 6:
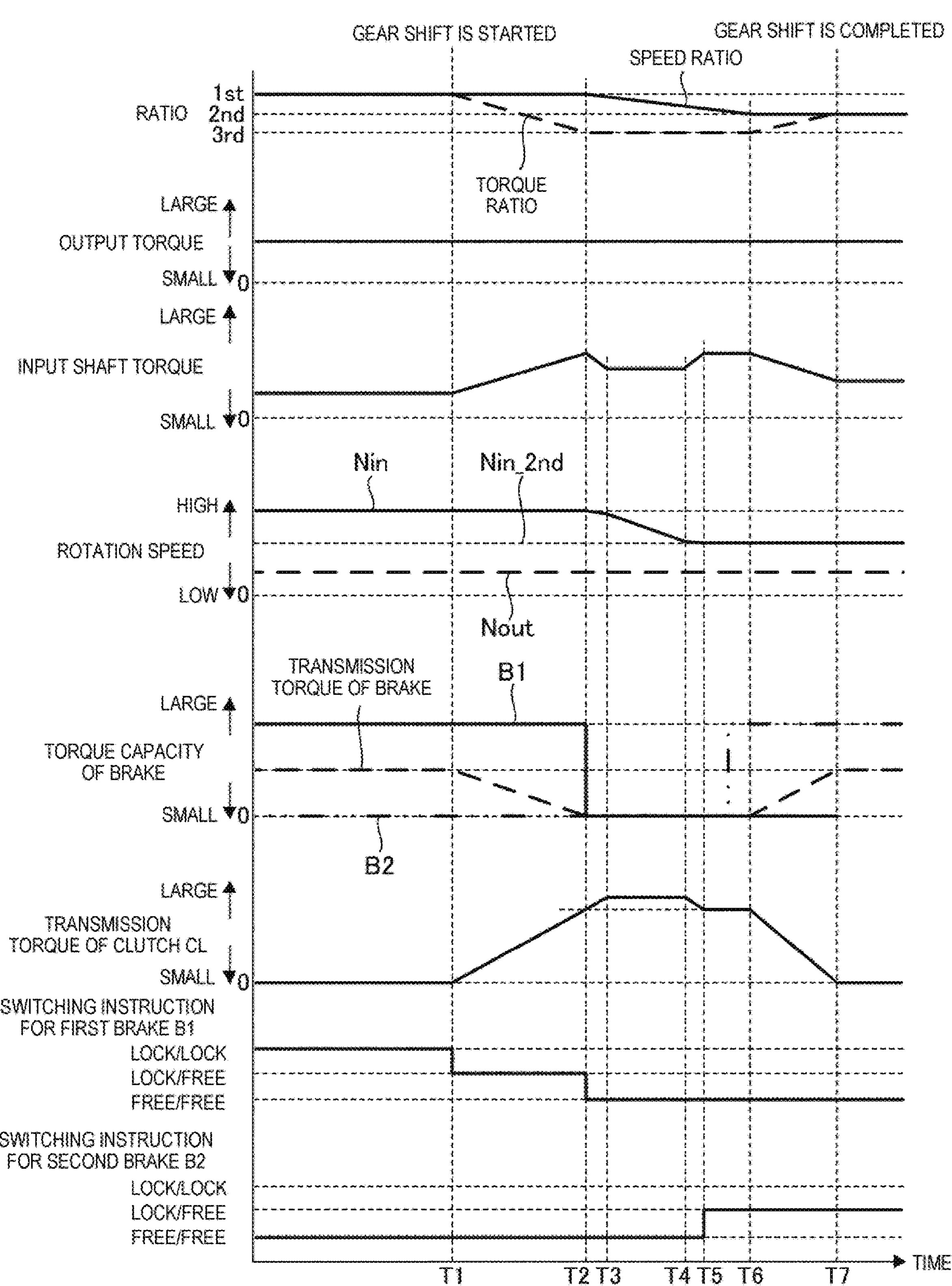
FIG. 6 is a diagram showing an example of a timing chart according to the embodiment.

Thus, the actuator 31 drives the first brake B1 by driving the first switching plate PL1. The actuator 31 can also drive the second brake B2 in the same manner as the first brake B1. The first switching unit SW1 and a second switching unit SW2 of the second brake B2 are configured to allow the first brake B1 and the second brake B2 to change states thereof as shown in FIG. 6, which will be described later, by driving of the actuator 31. Each of the first brake B1 and the second brake B2 constitutes a selectable one-way clutch.

Returning to FIG. 1, the unit 100 further includes a transmission controller 60 and an MG controller 70. The transmission controller 60 constitutes a transmission TM together with the transmission mechanism 20. The transmission controller 60 is a controller for controlling the transmission TM, and constitutes a control device of the transmission TM. The transmission controller 60 and the MG controller 70 for controlling the MG 40 are connected to each other such that communication is possible therebetween. The unit 100 may further include an integrated controller that controls the transmission controller 60, the MG controller 70, and the like in an integrated manner, and the transmission controller 60 and the MG controller 70 may be configured as a single controller.

Each of the transmission controller 60 and the MG controller 70 is implemented by one or a plurality of computers (microcomputers) including a central processing unit (CPU), a read-only memory (ROM), a random access memory (RAM), and an input/output interface (I/O interface). Each of the controllers 60 and 70 performs control by executing a program stored in the ROM or the RAM by the CPU. For example, a program stored in a non-transitory storage medium such as a CD-ROM may be used as the program.

Signals from a sensor and switch group 80 indicating various sensors and switches are input to the transmission controller 60. The sensor and switch group 80 includes, for example, a vehicle speed sensor that detects a vehicle speed VSP, an accelerator opening sensor that detects an accelerator opening APO, a position sensor that detects a rotation position of the actuator 31, an input rotation speed sensor that detects an input rotation speed Nin of the transmission TM, and an output rotation speed sensor that detects an output rotation speed Nout of the transmission mechanism 20. The input rotation speed Nin is, for example, a rotation speed of the rotary shaft 22, and the output rotation speed Nout is, for example, a rotation speed of the first carrier C1. Other suitable signals may be input to the transmission controller 60.

The transmission controller 60 controls the transmission TM based on the input signal. The transmission TM is controlled by controlling the actuator 31 or the clutch CL based on the input signal.

In the transmission TM, as the vehicle speed VSP increases, gear shift is performed from the first gear to the second gear and from the second gear to the third gear. In a case in which 1-2 gear shift, which is the gear shift from the first gear to the second gear, is performed, the engaged and disengaged states of the three engagement elements, that is, the first brake B1, the second brake B2, and the clutch CL, change from a state in which only the first brake B1 is engaged to a state in which only the second brake B2 is engaged as shown in FIG. 3. Therefore, the first brake B1 serves as an engagement element to be disengaged, and the gear shift is performed.

In this case, by setting, of the pair of left and right first claws CW1 described above with reference to FIG. 4A, the claw that does not perform torque transmission to the free position, first, the first brake B1 can be changed from the bi-directional restriction state to a one-way clutch state serving as the one-direction restriction state. Then, when the first brake B1 is changed from the one-way clutch state to the disengaged state, the first brake B1 can be disengaged.

However, in this case, meshing engagement is performed by the first brake B1. Therefore, in a state in which a torque is applied to the first brake B1, a force required for the disengagement is accordingly increased. As a result, there is a concern that the disengagement cannot be smoothly performed due to the torque applied to the first brake B1.

In view of such a circumstance, in the present embodiment, the transmission controller 60 performs the following control.

Figure 5:
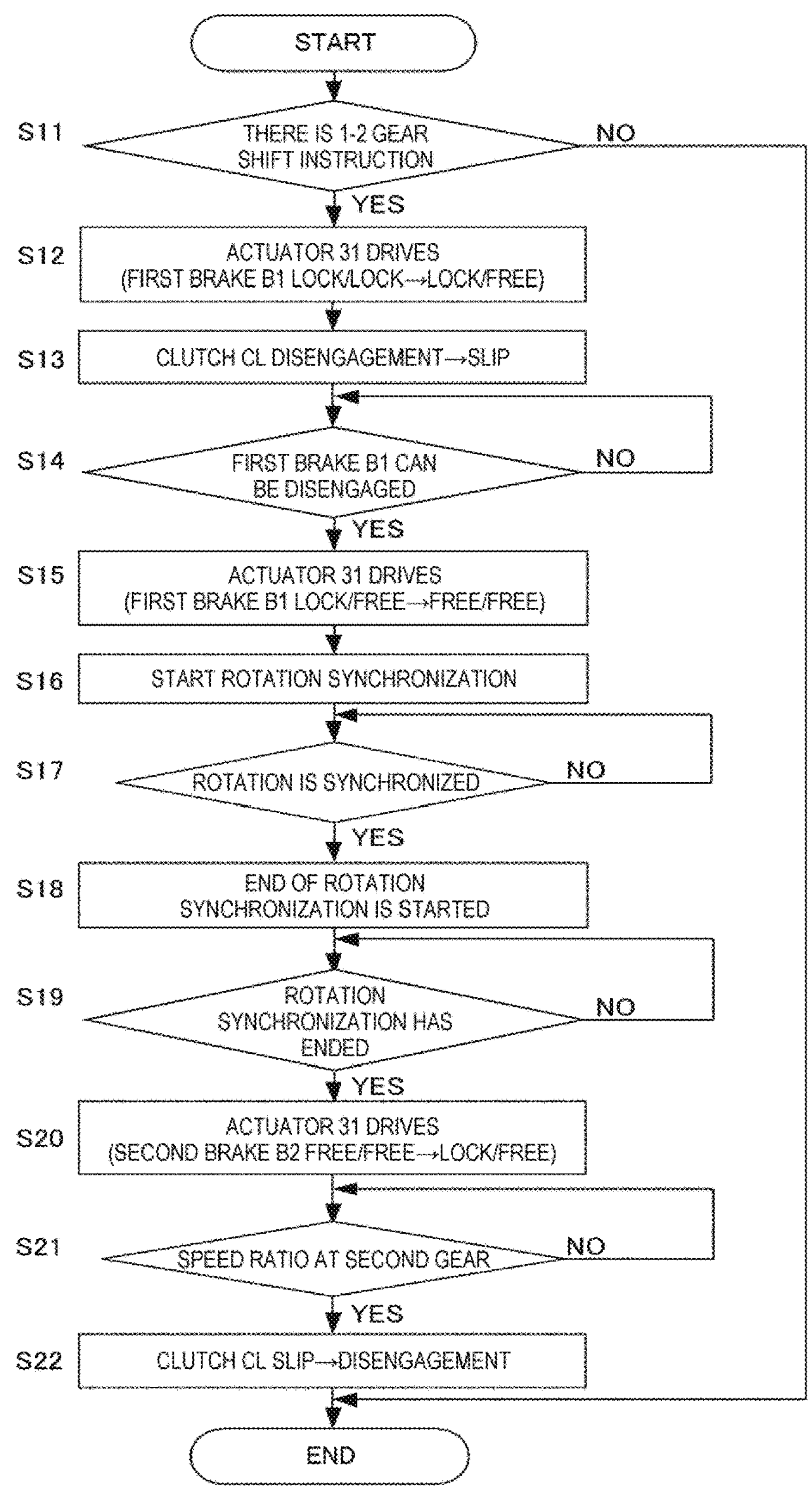
FIG. 5 is a diagram showing an example of control according to an embodiment by using a flowchart.

FIG. 5 is a diagram showing an example of the control performed by the transmission controller 60 by using a flowchart. In step S11, it is determined whether there is a 1-2 gear shift instruction. Whether there is the 1-2 gear shift instruction can be determined based on whether a condition for executing the 1-2 gear shift is satisfied. The condition for executing the 1-2 gear shift instruction may be, for example, an appropriate condition including a condition related to the vehicle speed VSP. If the determination is negative in step S11, the process once ends. If the determination is affirmative in step S11, the 1-2 gear shift is started, and the process proceeds to step S12, and further proceeds to step S13.

In step S12, the actuator 31 drives. As this driving, the first brake B1 is driven to change from a lock/lock state to a lock/free state. The lock/lock state is, in other words, the bi-directional restriction state, and the lock/free state is, in other words, the one-way clutch state.

In step S13, the clutch CL is controlled to change from the disengaged state to a slip state. Here, regarding the clutch CL which is a friction engagement element, the disengagement refers to a state in which the clutch CL does not have a torque capacity. Further, the slip refers to a state in which the clutch CL has the torque capacity but the clutch CL has an input and output rotation difference. The engagement or the complete engagement refers to a state in which the clutch CL has the torque capacity but the clutch CL does not have the input and output rotation difference.

The state in which the clutch CL does not have the torque capacity is, in other words, a state in which the clutch CL does not transmit power, and the state in which the clutch CL has the torque capacity is, in other words, a state in which the clutch CL transmits the power. Regarding the clutch CL, the slip is, in other words, a state in which the torque capacity of the clutch CL is smaller than an input torque, and the engagement or the complete engagement is, in other words, a complete engagement state in which the torque capacity of the clutch CL is larger than the input torque.

By changing the clutch CL to the slip state, the torque can be shared by the clutch CL, and thus the torque shared by the first brake B1 can be further reduced. A transmission torque of the clutch CL is gradually increased by controlling the clutch CL in step S13.

In step S14, it is determined whether the first brake B1 can be disengaged. As this determination, for example, it is possible to determine whether an expected elapsed time, which is set in advance, has elapsed as a time in which a torque capacity of the first brake B1 becomes zero after the actuator 31 drives in step S12. If the determination in step S14 is negative, the process returns to step S14. If the determination in step S14 is affirmative, the process proceeds to step S15.

In step S15, the actuator 31 drives. As this driving, the first brake B1 is driven to change from the lock/free state to a free/free state. The free/free state is, in other words, the disengaged state. In step S15, the first brake B1 is changed from the one-way clutch state to the disengaged state by driving the actuator 31 for the first brake B1 in a state in which the clutch CL is slipped in step S13. In this way, the torque shared by the first brake B1 can be reduced by increasing the torque shared by the clutch CL, and thus the first brake B1 is smoothly disengaged.

In step S16, rotation synchronization for engaging the second brake B2 is started. The rotation synchronization is started in response to the affirmative determination in step S14. The rotation synchronization is performed by controlling the clutch CL to further perform state change of the clutch CL to the engagement side and then further increasing the transmission torque of the clutch CL. As a result, the input rotation speed Nin starts to decrease, and a speed ratio (input rotation speed Nin/output rotation speed Nout) starts to decrease.

In step S17, it is determined whether the rotation is synchronized. As this determination, it is possible to determine whether the magnitude of a difference between the input rotation speed Nin and an input rotation speed Nin_2nd, which is the input rotation speed Nin corresponding to the second gear, is smaller than a predetermined value $\alpha$. The predetermined value $\alpha$ can be set in advance as a determination value for determining whether the input rotation speed Nin approaches the input rotation speed Nin_2nd to the extent that the second brake B2 performing the meshing engagement can be engaged. If the determination in step S17 is negative, the process returns to step S17. If the determination in step S17 is affirmative, the process proceeds to step S18.

In step S18, the end of the rotation synchronization is started. The rotation synchronization is ended by reducing the transmission torque of the clutch CL by an amount increased for the rotation synchronization.

In step S19, it is determined whether the rotation synchronization has ended. As this determination, for example, it is possible to determine whether the piston 27 returns to a rotation synchronization start position based on an operation amount of the electric actuator of the clutch CL. If the determination in step S19 is negative, the process returns to step S19. If the determination in step S19 is affirmative, the process proceeds to step S20.

In step S20, the actuator 31 drives. As this driving, the second brake B2 is driven to change from the free/free state to the lock/free state. Therefore, the second brake B2 is engaged as the one-way clutch state.

A gear shift shock is reduced when the second brake B2 is engaged, and thus there is a demand for state change in a direction in which the input and output rotation difference of the transmission TM decreases. On the other hand, the clutch CL remains in the slip state after being slipped in step S13 until step S21 to be described later.

Therefore, the second brake B2 is engaged in a state in which the clutch CL is slipped in step S20, and thus the clutch CL is slipped in advance at the time of engaging the second brake B2. As a result, at the time of engaging the second brake B2, the state of the transmission TM is changed in the direction in which the input and output rotation difference decreases.

After the first brake B1 is changed from the one-way clutch state to the disengaged state in step S15 and before the second brake B2 is engaged in S20, the clutch CL is slipped in a state in which the first brake B1 and the second brake B2 are disengaged.

Accordingly, a disengagement period for each of the first brake B1 and the second brake B2 is provided, and an interlock (double engagement state) of the first brake B1 and the second brake B2 is prevented. In addition, at this time, the clutch CL has the torque capacity, and thus a feeling of idle traveling of the vehicle is also restrained.

In step S21, it is determined whether the speed ratio becomes a speed ratio at the second gear. The speed ratio at the second gear can be grasped in advance. When the speed ratio at the second gear is achieved, the torque shared by the clutch CL is shared by the second brake B2, so that the changeover of the torque from the first brake B1 to the second brake B2 via the clutch CL can be completed, and the 1-2 gear shift can be accordingly completed. If the determination in step S21 is negative, the process returns to step S21. If the determination in step S21 is affirmative, the process proceeds to step S22.

In step S22, the clutch CL is controlled to change from the slip state to the disengaged state. In this control, the transmission torque of the clutch CL is gradually decreased by controlling the clutch CL. As a result, the torque shared by the clutch CL can be shared by the second brake B2, and the 1-2 gear shift can be completed.

After the second brake B2 is engaged as the one-way clutch state in the state in which the clutch CL is slipped in step S20, the clutch CL is disengaged in step S22. In this way, since the second brake B2 is changed to the one-way clutch state, for example, the torque is smoothly transferred from the clutch CL to the second brake B2 as compared with the case of changing to the lock/lock state. The process once ends after step S22.

FIG. 6 is a diagram showing an example of a timing chart corresponding to the process of the flowchart shown in FIG. 5. The 1-2 gear shift is started at a timing T1. When the 1-2 gear shift is started, first, the first brake B1 is controlled to the one-way clutch state by the driving of the actuator 31. Therefore, a switching instruction for the first brake B1 changes from the lock/lock state to the lock/free state, and the first brake B1 is controlled according to the switching instruction. When the 1-2 gear shift is started, the clutch CL is further controlled to the slip state. As a result, the transmission torque of the clutch CL gradually increases.

The increase in the transmission torque of the clutch CL means an increase in the torque shared by the clutch CL. Therefore, when the transmission torque of the clutch CL increases, the transmission torque of the brake decreases accordingly. The transmission torque of the brake at this time is the transmission torque of the first brake B1, and the first brake B1 is engaged by meshing. Therefore, at this time, the torque capacity of the first brake B1 does not particularly change.

An output torque of the transmission TM is constant. Therefore, when the transmission torque of the clutch CL increases, an input shaft torque of the transmission TM, that is, a torque of the rotary shaft 22 increases accordingly. As a result, a torque ratio (output torque/input torque) of the transmission TM decreases as the transmission torque of the clutch CL increases. When the transmission torque of the brake gradually decreases and becomes zero, only the clutch CL is subjected to the torque among the first brake B1, the second brake B2, and the clutch CL. Therefore, the torque ratio gradually decreases toward a torque ratio of the third gear.

The transmission torque of the brake becomes zero at a timing T2, and the torque ratio becomes the torque ratio of the third gear. As a result, no torque is applied to the first brake B1, and the meshing of the first claws CW1 of the first brake B1 meshed in the one-way clutch state can be easily released by the actuator 31.

Therefore, the switching instruction for the first brake B1 changes from the lock/free state to the free/free state at the timing T2, and the first brake B1 is controlled to the free/free state by the driving of the actuator 31. As a result, the speed stage is not the first gear. However, since the second brake B2 is disengaged at this time point, the speed stage is not the second gear as can be seen from the engagement table described above with reference to FIG. 3. A further increase in the transmission torque of the clutch CL is also started at the timing T2. Accordingly, the rotation synchronization for engaging the second brake B2 is started. As a result, the input rotation speed Nin starts to decrease, and the speed ratio starts to decrease.

The transmission torque of the clutch CL is kept constant from a timing T3. At a timing T4, the input rotation speed Nin approaches the input rotation speed Nin_2nd, and the rotation is synchronized. As a result, the transmission torque of the clutch CL starts to decrease at the timing T4, and the end of the rotation synchronization is started. At the time of the rotation synchronization, the input shaft torque decreases as the transmission torque of the clutch CL increases, and increases as the transmission torque of the clutch CL decreases.

At a timing T5, the transmission torque of the clutch CL returns to the magnitude at the timing T2, and the rotation synchronization ends. As a result, a switching instruction for the second brake B2 changes from the free/free state to the lock/free state so as to change the speed stage to the second gear, and the second brake B2 is controlled to the one-way clutch state by the driving of the actuator 31. The input rotation speed Nin becomes the input rotation speed Nin_2nd at the timing T5. When the second brake B2 actually enters the lock/free state, a torque capacity of the second brake B2 increases stepwise.

The speed ratio becomes the speed ratio at the second gear at a timing T6. Therefore, the transmission torque of the clutch CL starts to decrease, and the transmission torque of the brake starts to increase accordingly. Accordingly, the torque shared by the clutch CL decreases, the torque shared by the second brake B2 increases, and the torque ratio changes toward the torque ratio at the second gear. The input shaft torque decreases as the transmission torque of the clutch CL decreases.

The transmission torque of the clutch CL becomes zero at a timing T7. As a result, the torque shared by the clutch CL disappears, and the changeover of the torque from the first brake B1 to the second brake B2 via the clutch CL is completed. Therefore, the torque ratio also becomes the torque ratio at the second gear, and the 1-2 gear shift is completed.

Next, main functions and effects of the present embodiment will be described.

(1) The transmission TM includes the first brake B1, the second brake B2, and the clutch CL. The transmission controller 60 changes, by driving the actuator 31 for the first brake B1 in the state in which the clutch CL is slipped, the first brake B1 from the one-way clutch state to the disengaged state and then engages the second brake B2.

With such a configuration, when the first brake B1, which serves as the engagement element to be disengaged, is changed from the one-way clutch state to the disengaged state, the torque shared by the first brake B1 is reduced by increasing the torque shared by the clutch CL. Accordingly, a reaction force applied to the first claws CW1 of the first brake B1 as the engagement portions can be reduced, and thus the first brake B1 can be smoothly disengaged. For example, when the torque shared by the clutch CL is increased at once to achieve the complete engagement, the shock increases. Therefore, it is preferable to set the slip state in which the shared torque is smaller than that for the complete engagement.

(2) The transmission controller 60 changes the first brake B1 from the one-way clutch state to the disengaged state and then engages the second brake B2 in the state in which the clutch CL is slipped. With such a configuration, by slipping the clutch CL in advance at the time of engaging the second brake B2, the state of the transmission TM can be changed in the direction in which the input and output rotation difference decreases.

(3) After the first brake B1 is changed from the one-way clutch state to the disengaged state and before the second brake B2 is engaged, the transmission controller 60 slips the clutch CL in the state in which the first brake B1 and the second brake B2 are disengaged. With such a configuration, by providing the disengagement period for each of the first brake B1 and the second brake B2, the interlock of the first brake B1 and the second brake B2 can be prevented. In addition, at this time, the clutch CL has the torque capacity, and thus the feeling of idle traveling of the vehicle can also be restrained.

(4) The transmission controller 60 disengages the clutch CL after the second brake B2 is engaged as the one-way clutch state in the state in which the clutch CL is slipped. With such a configuration, since the second brake B2 is changed to the one-way clutch state, the torque can be smoothly transferred from the clutch CL to the second brake B2.

Although the embodiment of the present invention has been described above, the above embodiment is merely a part of application examples of the present invention, and is not intended to limit the technical scope of the present invention to the specific configurations of the above embodiment.

For example, in the embodiment described above, the case in which the actuator 31 shared by the first brake B1 and the second brake B2 is provided has been described. However, different actuators may be provided for the first brake B1 and the second brake B2.

The present application claims a priority based on Japanese Patent Application No. 2022-123113 filed with the Japan Patent Office on Aug. 2, 2022, all the contents of which are hereby incorporated by reference.

DESCRIPTION OF REFERENCE SIGNS

- 10 housing
- 20 transmission mechanism
- 30 drive device
- 31 actuator
- 60 transmission controller (control device, computer)
- 100 unit
- B1 first brake (first engagement element)
- B2 second brake (second engagement element)
- CL clutch (third engagement element)
- TM transmission

The invention claimed is:

1. A control device for a transmission including a first engagement element, a second engagement element, and a third engagement element, wherein in a state in which the third engagement element is changed from a disengaged state to a slip state to share a torque thereby reducing a torque shared by the first engagement element, the first engagement element is changed from a one-way clutch state to a disengaged state by driving an actuator for the first engagement element, and then the second engagement element is engaged.

2. The control device for a transmission according to claim 1, wherein the first engagement element is changed from the one-way clutch state to the disengaged state, and then the second engagement element is engaged in the state in which the third engagement element is slipped.

3. The control device for a transmission according to claim 2, wherein after the first engagement element is changed from the one-way clutch state to the disengaged state and before the second engagement element is engaged, the third engagement element is slipped.

4. The control device for a transmission according to claim 2, wherein after the second engagement element is engaged as the one-way clutch state in the state in which the third engagement element is slipped, the third engagement element is disengaged.

5. A method for controlling a transmission including a first engagement element, a second engagement element, and a third engagement element, the method comprising:

changing the first engagement element from a one-way clutch state to a disengaged state by driving an actuator for the first engagement element in a state in which the third engagement element is changed from a disengaged state to a slip state to share a torque thereby reducing a torque shared by the first engagement element, and then engaging the second engagement element.

6. A non-transitory computer-readable medium storing a program for causing a computer of a transmission including a first engagement element, a second engagement element, and a third engagement element to execute a procedure, wherein the program causes the computer to execute the procedure of changing, in a state in which the third engagement element is changed from a disengaged state to a slip state to share a torque thereby reducing a torque shared by the first engagement element, the first engagement element from a one-way clutch state to a disengaged state by driving an actuator for the first engagement element, and then engage the second engagement element.

* * * * *